US005197142A

United States Patent [19]

Williams et al.

[11] Patent Number: 5,197,142

[45] Date of Patent: Mar. 23, 1993

[54] MEMORY ARBITRATION BETWEEN TIMEKEEPING CIRCUITRY AND GENERAL PURPOSE COMPUTER

[75] Inventors: Clark R. Williams; William J. Podkowa, both of Plano, Tex.

[73] Assignee: Dallas Semiconductor Corp., Dallas, Tex.

[21] Appl. No.: 644,413

[22] Filed: Jan. 22, 1991

Related U.S. Application Data

[63] Continuation of Ser. No. 208,890, Jun. 17, 1988, abandoned.

[51] Int. Cl.[5] .......... G06F 13/14

[52] U.S. Cl. .......... 395/425; 364/967.2; 364/966.4; 364/969.3; 364/934; 364/DIG. 2; 395/550

[58] Field of Search .......... 395/425, 550

[56] References Cited

U.S. PATENT DOCUMENTS

| | | | |
|---|---|---|---|
| 4,320,501 | 3/1982 | LeDieu | 370/63 |
| 4,371,932 | 2/1983 | Dinwiddie, Jr. | 364/200 |
| 4,512,012 | 4/1985 | Sampei | 370/63 |
| 4,542,480 | 9/1985 | Orii | 364/900 |
| 4,562,537 | 12/1985 | Barnett | 364/200 |
| 4,569,043 | 2/1986 | Simmons | 370/63 |
| 4,581,732 | 4/1986 | Boisseau | 370/63 |
| 4,620,118 | 10/1986 | Barber | 364/200 |
| 4,658,397 | 4/1987 | Kawamura | 370/63 |
| 4,672,604 | 6/1987 | Bhatia | 370/58 |
| 4,680,701 | 7/1987 | Cochran | 364/200 |
| 4,680,752 | 7/1987 | Takemura | 370/63 |
| 4,701,907 | 10/1987 | Collins | 370/63 |
| 4,724,520 | 2/1988 | Athanas et al. | 364/200 |
| 4,744,078 | 5/1988 | Kowalczyk | 364/200 |
| 4,796,232 | 1/1989 | House | 364/900 |
| 4,812,627 | 3/1989 | Wexler | 364/406 |
| 4,815,074 | 3/1989 | Jacobsen | 370/112 |
| 4,849,919 | 7/1989 | Haneda | 371/12 |

OTHER PUBLICATIONS

DS1215 Preliminary Data Sheet from 1987 Data Book.

*Primary Examiner*—Lawrence E. Anderson
*Assistant Examiner*—Eric Coleman
*Attorney, Agent, or Firm*—Worsham, Forsythe, Sampels & Wooldridge

[57] ABSTRACT

Arbitration logic is provided to receive conflicts between a timekeeping system and a user system which share a common memory. The common memory is comprised of an array of dual memory cells, each of which has a timekeeping cell and a user cell and circuitry for transferring data from the timekeeping cell to the user cell or from the user cell to the timekeeping cell. User data is written into the user cells when it is available and immediately thereafter is transferred from the user cells to the timekeeping cells. Data from the timekeeping system is inhibited from being written into the timekeeping cells if, during the present update cycle of the timekeeping system, the user writes data into the common memory.

37 Claims, 2 Drawing Sheets

MEMORY ARBITRATION BETWEEN TIMEKEEPING CIRCUITRY AND GENERAL PURPOSE COMPUTER

This is a continuation of application Ser. No. 208,890, filed Jun. 17, 1988, now abandoned.

REFERENCE TO RELATED APPLICATION

Reference is made to a related application entitled "DUAL STORAGE CELL MEMORY," Ser. No. 203,424 filed Jun. 7, 1988 in the name of Jiang, Ching-Lin and Williams, Clark R., and now issued as U.S. Pat. No. 4,873,665. This application discloses and claims a dual cell memory and memory array which are used in the preferred embodiment of the present invention.

TECHNICAL FIELD

This invention relates to electronic memories, and more particularly, to shared memories used by two systems operating asynchronously with respect to each other.

BACKGROUND OF THE INVENTION

In certain applications stored data is shared by two systems which operate asynchronously with respect to each other. This shared data is written and read by both systems.

An example of this type of shared data is incorporated in a timekeeping circuit used in a general purpose computer in which the timekeeping circuit stores time data in a shared or common memory also connected to the computer bus. The timekeeping circuitry periodically reads the time out of the common memory, updates the time, and rewrites the time back into the common memory. A user, through the computer bus, can also read the time from the common memory when required and write corrected time back into the common memory. The time circuitry and the computer both operate with independent clocks and, therefore, operate asynchronously with respect to each other.

However, a collision can occur when both the time circuit and user are trying to write data into the common memory at the same time. The present invention is directed to avoid these collisions by arbitrating the data as it is written into the common memory.

SUMMARY OF THE INVENTION

It is, therefore, an object of this invention to provide a method and circuitry for arbitrating data being written into a common or shared memory.

Shown in an illustrated embodiment of the invention is a method for storing data from a first system and a second system into a common memory. The method includes writing data from the first system into a first memory section of the common memory and transferring the data from the first memory section to a second memory section of the common memory after data has been written into the first section. The method also includes writing data from the second system into the second memory section if the first system has not written data into the first memory location during the present memory access cycle of the second system. The method also includes transferring data from the second memory section to the first memory section after data has been written into the second memory section.

In a further aspect of the invention, the transferring of data from the second memory section to the first memory section is delayed if the first system is writing data into the common memory or if data is being transferred from the first memory section to the second memory section at the time when the normal transfer of data from the second memory section to the first memory section would occur, the delay extending until data is transferred from the first memory section to the second memory section.

Also shown in an illustrated embodiment of the invention is arbitration circuitry for arbitrating data being written into a common memory from a first system and a second system which includes circuitry for writing data from the first system into a first section of the common memory upon receipt of a write command signal from the first system and circuitry for transferring data from the first memory section to the second memory section after data has been written into the first memory section. The arbitration circuitry also includes circuitry for writing data from the second system into the second memory location upon receipt of a write command signal from the second system if the first system has not written data into the common memory during the present memory access cycle of the second system. The arbitration circuitry also includes circuitry for transferring data from the second memory location to the first memory location after data has been written into the common memory by the second system.

In a further aspect of the invention, the circuitry for transferring data from the second memory section to the first memory section includes circuitry for delaying the transfer of data from the second memory section to the first memory section if data is being written into the common memory by the first system or data is being transferred from the first memory section to the second memory section at the time when the normal transfer of data from the second memory section to the first memory section would occur, said delay extending until data is transferred from the first memory section to the second memory section.

BRIEF DESCRIPTION OF THE DRAWINGS

The aforementioned and other features, characteristics, advantages, and the invention in general, will be better understood from the following, more detailed description taken in conjunction with the accompanying drawings in which.

Figure 3:
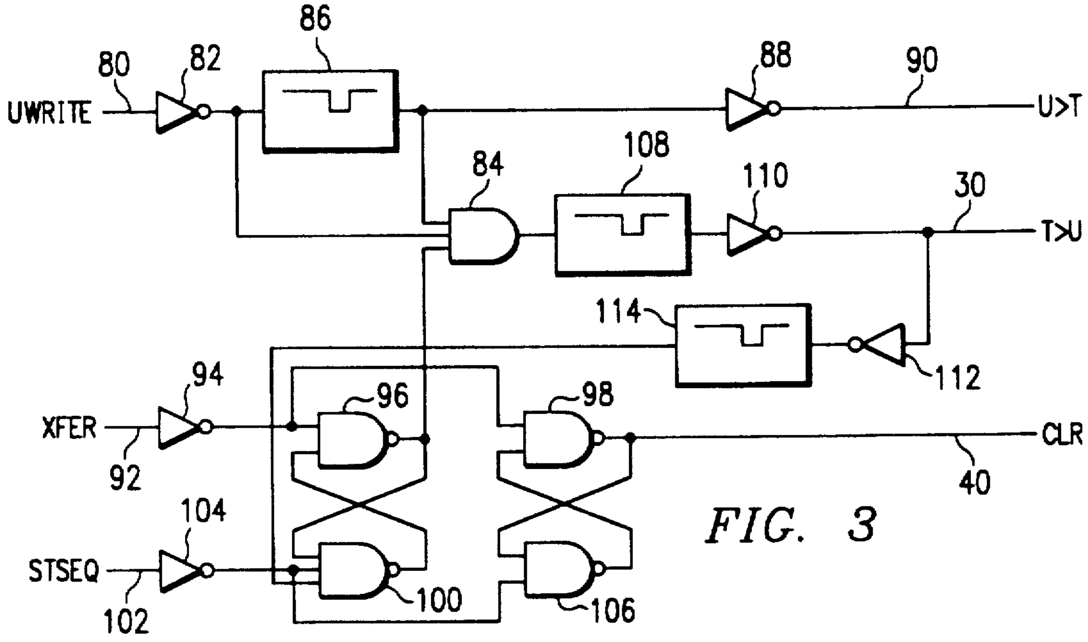
FIG. 3 is a logic diagram of a portion of the sequencer of FIG. 1 which shows additional arbitration circuitry according to the present invention.

It will be appreciated that for purposes of clarity and where deemed appropriate, reference numerals have been repeated in the figures to indicate corresponding features, and that the pulse width shown in FIG. 3 have not necessarily been drawn to scale in order to more clearly show timing relationships in the preferred embodiment of the present invention.

DESCRIPTION OF THE PREFERRED EMBODIMENT

The preferred embodiment of the present invention is used in conjunction with a common memory which includes an array of dual cell memory modules as described in a co-pending application entitled "DUAL STORAGE CELL MEMORY," Ser. No. 203,424, filed Jun. 7, 1988, in the name of Jiang, Ching-Lin and Williams, Clark R., and now issued as U.S. Pat. No. 4,873,665 and hereby incorporated by reference. Each of the dual cell memory modules includes an upper cell, referred to as a timekeeping cell and a lower cell, referred to as a user cell. These two cells in each module ar coupled together with circuitry to permit direct transfer of data from the timekeeping cell to the user cell and from the user cell to the timekeeping cell.

In the preferred embodiment eight dual cell memory modules store eight bits or one byte of data representing the current time in seconds. Additional bytes of eight dual cell memory modules are also used to store minutes, hours, days of the week, days of the month, months, and years. The timekeeping cells have their own read and write circuitry and form the timekeeping section of the common memory. This section is connected to timekeeping circuitry which periodically performs memory access cycles by reading and writing data into the timekeeping section and transferring data from the timekeeping section into the user section. The user cells also have their own read and write circuitry and are connected to a computer bus in the preferred embodiment. The computer bus is part of the interface with a user which permits a user to read and write data from the user section of the common memory.

In operation the timekeeping circuit, once a second, performs a memory access cycle or update cycle by first reading the seconds byte of data, incrementing the seconds, and rewriting the seconds byte back into the timekeeper section of the common memory. If the seconds data changes from 59 to 00, then the timekeeping circuit also reads, increments, and rewrites the minutes byte of data. In a similar manner, each of the bytes are read and incremented as required. If a byte being read does not change to its beginning count, such as if the seconds after being incremented is not at 00, then the timekeeping circuit does not read any more of the higher bytes of data. At a predetermined time interval after the update begins, a command is issued to transfer all of the data in a timekeeping section into the user section of the common memory. The timekeeping circuit does not access the common memory between the update cycles.

Data is read from the user section of the common memory independently of the reading and writing operations in the timekeeping section. However, a collision can occur if data is written into the user section and then transferred to the timekeeping section at the same time the timekeeping section is performing an update procedure.

In order to ensure that the data written into the common memory by the user will not be overwritten by the timekeeping data, arbitration logic is provided to a) transfer new user data from the user section to the timekeeping section of the common memory immediately after the user data is written into the user section of the memory; b) inhibit further writes into the timekeeping section for the byte written into by the user and for all higher order bytes of stored data during the present update cycle; and c) delay the normal transfer of data from the timekeeping section to the user section if a user write is occurring or a transfer is occurring between the user section to the timekeeping section, this delay lasting until the data is transferred from the user section into the timekeeping section.

Further, since the transfer of a bit of data from the user cell to the timekeeping cell depends on current supplied through the p-channel transistor of the six-transistor memory cell to charge an internal node of the timekeeping cell from ground to VCC, and since this p-channel transistor is relatively small, the transfer will not occur reliably if the enable transistors of the timekeeping cell receiving the transfer data are also conductive during a read operation since the capacitance of the memory bit line would be loading the p-channel transistor under these conditions. Therefore, the arbitration circuitry includes additional transistors to pull up the timekeeping bit lines if a transfer from the user cell to the timekeeping cell occurs at the same time a read operation of the timekeeping cell is occurring. While this pull up of the bit lines corrupts the data being read, the corrupted data is ignored since subsequent write operations into the timekeeping section are inhibited by the arbitration circuitry until the next update cycle.

Figure 1:
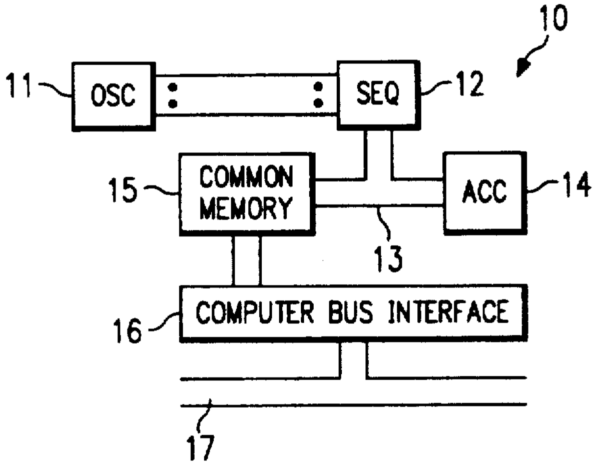
FIG. 1 is a block diagram of a timekeeping circuit in a computer which contains arbitration circuitry according to the present invention.

Turning now to the drawings, FIG. 1 is a block diagram of a timekeeping circuit 10 in a general purpose computer. The timekeeping circuit 10 contains arbitration circuitry according to the present invention. The timekeeping circuit 10 includes an oscillator 11. The oscillator 11 provides timing signals to the sequential logic 12. The sequential logic 12 is connected on a bus 13 to an accumulator 14 and to a common memory 15. The common memory 15 is connected to a computer bus interface 16 which in turn is connected to a computer bus 17 of the general purpose computer.

The timekeeping circuit 10 in the preferred embodiment operates by sequentially reading the time data stored in the common memory 15, updating the time data in the accumulator 14 and writing the updated time into the common memory 15. The computer bus interface 16 allows the user through the computer bus 17 to read and write the time data in the common memory 15.

More specifically, the oscillator 11 provides a clock signal to the sequencer 12 which changes from a logic 1 level to a pulse train once a second. The sequencer 12, upon receipt of the pulse train first reads the seconds data in the common memory 15, increments the seconds data in the accumulator 14, and then rewrites the incremented seconds data into the common memory 15. The sequencer 12 also detects if the seconds data is at 59 seconds prior to the update. If the seconds data is at 59 seconds prior to being incremented, then the sequencer, after the seconds data is written into the common memory 15, reads the minutes data in the common memory 15 and increments and writes the minutes data. In a similar manner, the hours, the day of the week and day of the month, the month, and the year are updated as required. At the end of the update cycle, the sequencer 12 in the preferred embodiment reads seconds alarm data and seconds time data and the two numbers are compared to each other in the accumulator 14 to determine if they match. If there is a match, then the minutes alarm data and the minutes time data are read and compared. If the minutes also match, then the hours alarm data and the hours time data are read and compared. If the two sets of hours data match, the sequencer 12 provides a signal to the computer bus interface 16 that an alarm match has been found. Any time a match is not found, the alarm sequence is terminated. At the end of the alarm sequence, the sequencer 12 sends a signal to the oscillator 11 to hold the clock signal to the sequencer 12 at a logic 1 level where it stays until the next update cycle is to begin at which time the oscillator 11 again provides a pulse train clock signal to the sequencer 12.

Operating asynchronously to the timekeeping circuit 10, the computer through the computer bus 17 is able to read and write the time data in the common memory 15. However, a collision can occur if the computer is trying to write data into the common memory 15 at the same time that the sequencer 12 is reading or writing data from or to the common memory 15. The arbitration circuitry of the present invention enables this asynchronous writing into the common memory 15 to ensure that the data in the common memory data is not corrupted during a write cycle by the user or by the timekeeping circuit 10.

Figure 2:
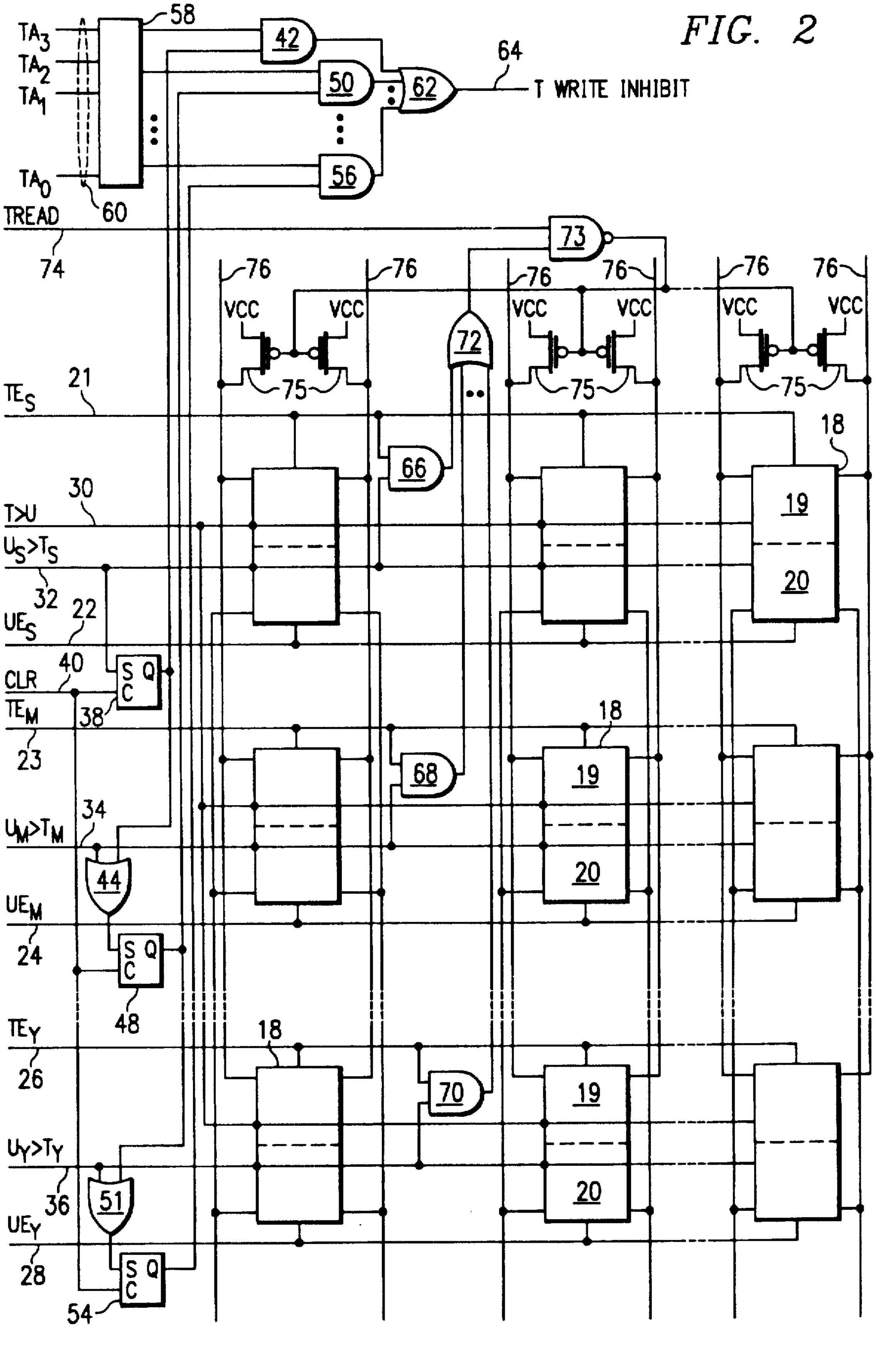
FIG. 2 is a logic diagram of a portion of the common memory of FIG. 1 and includes arbitration circuitry according to the present invention.

Turning now to FIG. 2, a portion of the arbitration circuitry according to the present invention is contained in the common memory 15 and is shown in FIG. 2. As shown in FIG. 2 the timekeeping memory includes an array of dual storage cell memory modules or dual memories 18 arranged in rows and columns. These dual cell memory modules are described in the aforementioned co-pending application. The dual memory cells 18 include an upper or timekeeping cell 19 and a lower or user cell 20. The top row is used to store eight bits or one byte of seconds data, and the next row is used to store one byte of minutes data, and the last row is used to store one byte of year data. All of the timekeeping cells 19 of the dual memory cells 18 form the timekeeping section of the memory array and all of the user cells 20 form the user section of the memory array.

Each of the rows has a time enable line 21 connected to the enable transistors of the timekeeping cells 19 and a user enable line 22 is connected to the enable transistors in each of the user cells 20 of the first row of the memory array. Similarly, each of the other rows has time enable lines such as the time enable line 23 for the second or minutes row of the memory array and the user enable line 24 for the second row. The last row has a time enable line 26 and a user enable line 28.

A line 30 labeled T>U provides a signal to transfer data from the timekeeping cells 19 into the user cells 20 for all of the dual memory cells 18 in the memory array. A corresponding line 32 labeled $U_S > T_S$ provides a signal to the first row of the dual memory cells 18 to transfer data from the user cell 20 to the timekeeping cell 19. Similarly, a line 34 labeled $U_M > T_M$ is used to transfer data from the user cell 20 to the timekeeping cell 19 in the second row of the memory array, and a signal line 36 labeled $U_Y > T_Y$ transfers user data to the timekeeping cell 19 in the last row of the memory array.

The arbitration circuitry includes a latch associated with each row of the memory array. The first row has a latch 38 which has its set input connected to line 32 and its clear input connected to a CLR signal labeled on a line 40. The Q output of the latch 38 is connected to one input of an AND gate 42 and to one input of an OR gate 44. The output of the OR gate 44 is connected to the set input of another latch 48. The clear input of the latch 48 is connected to the line 40 and the Q output of the latch 48 is connected to one input of another AND gate 50 and also to one input of another OR gate associated with the latch for the third row and not shown in FIG. 2. The last row of the memory array has an OR gate 51 one input of which is connected to a signal line 36 and the other input is connected to the Q output of the latch associated with the previous row of the memory array. The output of the OR gate 51 is connected to the set input of another latch 54, the clear input of which is connected to the CLR signal line 40. The Q output of the latch 54 is connected to the input of another AND gate 56. The second inputs of the AND gates 42, 50, and 56 are each outputs from an address decode circuit 58 which receives as inputs four address lines 60 consisting of the address signals $TA_0$, $TA_1$, $TA_2$, and $TA_3$. The output of the AND gates 42, 50, 56, and other similar AND gates which have inputs from the address decode circuit 58 and from the Q outputs of latches of the other rows not shown in FIG. 2 are all connected as inputs to an OR gate 62, the output of which forms the timekeeping write inhibit signal on a line 64.

Each of the rows of the memory cells has associated with it a two input AND gate including AND gates 66, 68, and 70 shown in FIG. 2. Each of the two input AND gates 66, 68, 70, and the other AND gates associated with the other rows not shown in FIG. 2 has a first input connected to the enable lines for the timekeeping cells 19 such as lines 21, 23, and 26 and a second input connected to the lines which transfer data from the user cells 20 into the timekeeping cells 19 such as signal lines 32, 34, and 36. The output of the AND gates 66, 68, and 70, and the other similar AND gates not shown in FIG. 2 are all connected as inputs of an OR gate 72, the output of which is connected to one input on a NAND gate 73. The other input of the NAND gate 73 is connected to a TREAD signal line 74. The output of the NAND gate 73 is connected to the gates of a plurality of p-channel transistors 75, the sources of which are connected to VCC. The drains of each of the p-channel transistors 75 are connected to one of the bit lines 76 for each of the timekeeping cells 19. Thus when the output of the NAND gate 73 is a logic 0 level, the p-channel transistors 75 will operate to couple the bit lines of the timekeeping cells 19 to VCC.

FIG. 3 is a logic diagram of additional arbitration circuitry which is contained within the sequencer 12 shown in FIG. 1. The additional arbitration circuitry in FIG. 3 receives a signal labeled UWRITE on a line 80 which is connected to the input of an inverter 82, the output of which is connected to one input of an AND gate 84 and also connected to the input of a monostable multivibrator or one shot 86. The output of the one shot 86 is connected to a second input of the AND gate 84 and also to the input of an 28 inverter 88, the output of which forms the U>T signal on a line 90. This U>T signal is then decoded in circuitry not shown in FIG. 3 in order to form the signals $U_S > T_S$, $U_M > T_M$, etc. used in the common memory 15.

An XFER pulse on a line 92 is connected to the input of an inverter 94, the output of which is connected to one input of an NAND gate 96. The output of the inverter 94 is also connected to the input of another NAND gate 98. The output of the NAND gate 96 is connected to an input of another NAND gate 100 and also to a third input of the AND gate 84. Another signal, STSEQ, on a line 102 is connected to the input of an inverter 104, the output of which is connected to another input of the NAND gate 100 and also connected to the input of another NAND gate 106. The output of the NAND gate 100 is connected to another input of the NAND 96 and the NAND gates 96 and 100 operate as an RS latch. Similarly, the output of the NAND gate 98 is connected to another input of the NAND gate 106 and the output of the NAND gate 106 is connected to another input of a NAND gate 98 to form an RS latch. The output of the NAND gate 98 forms the CLR signal on line 40. The output of the AND gate 84 is connected to the input of another one shot 108. The output of the one shot 108 is connected to the input of another inverter 110, the output of which forms the T>U signal on line 30. The output of the inverter 110 is also connected to the input of another inverter 112, the output of which is connected to the input of another one shot 114, the output of which is connected to a third input of the NAND gate 100.

The operation of the arbitration logic will now be described with reference to FIG. 4. When the oscillator 11 switches the clock line to the sequencer 12 to a pulse train rather than a logic 1 level, the oscillator 11 also provides an STSEQ pulse on line 102. The STSEQ pulse therefore occurs once a second. The oscillator 11 also provides the XFER pulse at a predetermined time after the STSEQ pulse. The XFER pulse is a signal to transfer data from the timekeeping cells 19 to the user cells 20 in the memory array. Thus when the STSEQ pulse arrives on line 102, the CLR signal on line 40 goes low as shown on the left hand side of FIG. 4. Immediately after the CLR signal goes low, the sequencer 12 reads the seconds from the common memory 15 as shown by the RTS line in FIG. 4. The seconds data is then updated and written back into the common memory 15 as shown by the WTS line in FIG. 4. If the seconds read is not at 59, then the sequencer 14 does not read the minutes or other present time data in the memory array and thus the read minutes line shown as RTM and the write minutes line shown as WTM in FIG. 4 stay low during the time period shown on the left hand portion of FIG. 4. The second update cycle is shown in the right hand portion of FIG. 4 in which the present seconds read from the common memory is at 59 and therefore a command to read the present minutes, the RTM command, is initiated; the minutes are updated; and then a write minutes command is also initiated.

Below the WTM line is the T>U signal on line 30. As shown in the left hand portion of FIG. 4, this transfer normally occurs at the same time that the CLR signal goes back to a logic 1 level. Below the T>U signal in FIG. 4 is a WUM line which indicates that data is being written from the user into the minute user cells 20 of the memory array. Below the WUM line is the $U_M>T_M$ line which shows that the user data is transferred from the user cells 20 into the timekeeping cells 19 immediately after data is written by the user into the user cells 20 of the memory array.

Figure 4:
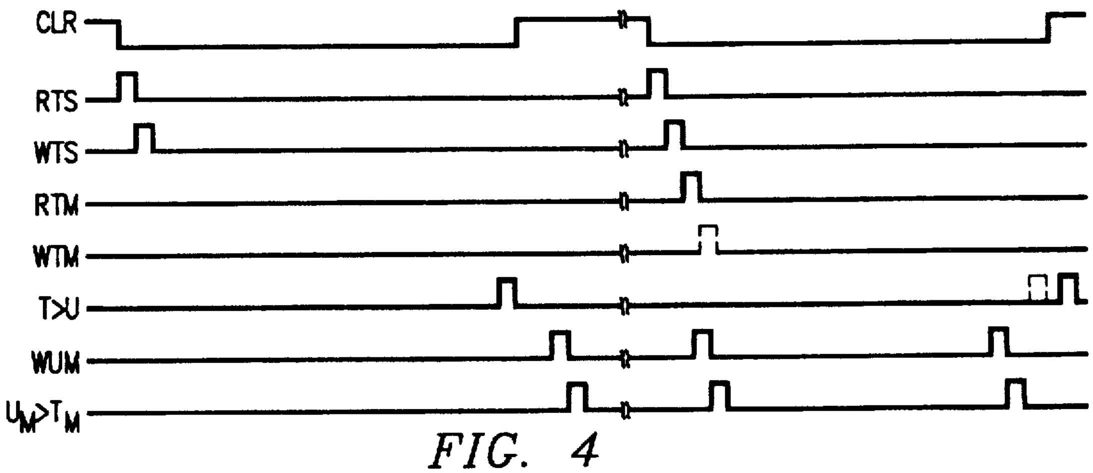
FIG. 4 is a timing diagram for use in describing the operation of the present invention.

As shown in FIG. 4 when the user writes seconds or any data into the memory array during the time that the CLR signal is at a logic 1 level, then there is no conflict between the timekeeping circuit 10 and the user. During this user write, the CLR line 40 is a logic 1 level which holds the Q outputs of the latches 38, 48, and 54 at a logic 0 level and therefore the timekeeping write inhibit line 64 remains at a logic 0 level. Also since none of the time enable lines such as lines 21, 23, and 26 is at a logic 1 level during this time, the output of the NAND gate 73 remains at a logic 1 level and thus the p-channel transistors 75 remain nonconductive.

The circuitry shown in FIG. 3 operates in the following manner for the operation shown in the left hand portion of FIG. 4: upon receipt of the STSEQ pulse on line 102, the output of the NAND gate 96 becomes a logic 0 level while the output of the inverter 82 and the one shot 86 is at a logic 1 level and therefore the output of the AND gate 84 is at a logic 0 level which inhibits the operation of the one shot 108. Upon receipt of the XFER pulse on line 92, the output of the NAND gate 96 switches to a logic 1 level, which causes the output of the AND gate 84 to change to a logic 1 level which fires the one shot 108 to generate the T>U signal on line 30. The one shot circuits 86, 108, and 114 are triggered by a rising edge at their inputs. The falling or trailing edge of the T>U signal on line 30 is inverted to trigger the one shot 114 at the end of the T>U pulse and the output of which is fed back as a third input to the NAND gate 100 to reset the output of the NAND 96 to a logic 0 level. Thus, the arrival of the XFER signal on line 92 initiates the T>U signal on line 30 and also forces the CLR line 40 to a logic 1 level.

Later when the user writes into the seconds row of the memory array, the UWRITE signal on line 80 goes to a logic 1 level and then to a logic 0 level, and this falling edge is inverted and fires the one shot 86 to form the U>T signal on line 90. While the UWRITE signal on line 80 and U>T signal on line 90 is at a logic 1 level, then the output of the AND gate 84 is held at a logic 0 level; however, for the timing shown in the left hand portion of FIG. 4, the output of the NAND gate 96 is also at a logic 0 level during the time that the UWRITE signal on line 80 and the U>T signal on line 90 is at a logic 1 level.

Turning now to the timing shown on the right hand side of FIG. 4, the WUM signal goes high during the time that the RTM signal is high, indicating that data is being written into the minutes byte in the user cell 20 during the same time that data is being read from the minutes cells 19 by the sequencer 12. Immediately following the user write into the minutes byte, the $U_M>T_M$ on line 34 goes to a logic 1 level. The AND gate 68 then detects a logic 1 level on the $TE_M$ line 23 and the $U_M>T_M$ signal on line 34 and the output of the AND gate 68 becomes a logic 1 level which causes the output of the OR gate 72 to become a logic 1 level which causes the output of the NAND gate 73 to be a logic 0 level which enables or makes conductive the p-channel transistors 75 which pulls the bit lines associated with the timekeeping cells 19 to a logic 1 level to enable the user timekeeping data to be reliably transferred into the timekeeping cells 19 in the second row of the memory array.

Also, the logic 1 level on the $U_M>T_M$ line 34 forces the output of the OR gate 44 to a logic 1 level which forces the Q output of the latch 48 to a logic 1 level. This Q output of the latch 48 is used by the AND gate 50 and the OR gate 62 to inhibit further writes into the second row of the memory array. The logic 1 level at the Q output of the latch 48 also sets the Q output of the next row latch to a logic 1 level and each of the succeeding rows down through the last row to a logic 1 level. Thus the Q output of the latch 54 will also be a logic 1 level and will bus through AND gate 56 and OR gate 62 inhibit writes into any of the rows of the logic array except the first row. Thus, the present read by the sequencer which has been disturbed by the operation of the p-channel transistor 75 will have no effect on the data stored in the common memory since all of the succeeding writes into the common memory will be inhibited by the TWRITE inhibit line 64. The Q outputs of the latches 38, 48, and 54 will go to a logic 0 level upon the next logic 1 level at the CLR line 40.

Also shown in FIG. 4 a second user write operation occurs when the normal update or transfer of data from the timekeeping cells 19 into the user cells 20 would normally occur as shown by the phantom pulse on the right hand side of FIG. 4. As shown in FIG. 3, when the UWRITE line 80 or the U>T line 90 is a logic 1 level, then the output of the AND gate 84 will be inhibited. When the XFER signal on line 92 goes to a logic 1 level, which forces the output of the NAND gate 96 to a logic 1 level which would normally begin the data transfer from the timekeeping section to the user section, this transfer is delayed until the time that both the UWRITE signal on line 80 and the U>T signal on line 90 go to a logic 0 level. At that point the output of the AND gate 84 goes to a logic 1 level to fire the one shot 108 and form the T>U pulse on line 30.

As can be seen from the foregoing discussion, the user data is always written into the memory when it is available and the arbitration logic protects the user data from being corrupted by the timekeeping data during the present update cycle of the timekeeping circuit 10. Thus, the arbitration circuitry of the present invention operates to resolve conflicts between the timekeeping circuit 10 and the user data on the computer bus 17 with respect to writing data into the common memory 15.

Although the invention has been described in part by making detailed reference to a certain specific embodiment, such detail is intended to be, and will be understood to be, instructional rather than restrictive. It will be appreciated by those skilled in the art that many variations may be made in the structure and mode of operation without departing from the spirit and scope of the invention as disclosed in the teachings contained herein.

What is claimed is:

1. A method for sharing time data, between a general-purpose computer system and a timekeeping system, in a common memory, comprising the steps of:

periodically performing memory access cycles from said timekeeping system, each of said memory access cycles comprising at least one write operation which writes a value corresponding to the current time, said memory access cycles being separated by periods of non access to said common memory by said timekeeping system, and a) intermittently writing data from said general-purpose system into a first memory section of said common memory;

b) after each said step a), performing a block transfer of the data written during said step a) from said first memory section, to a second memory section in said common memory;

c) during said memory access cycles, writing data from said timekeeping system to said second memory section if said general-purpose system has not written data into said first memory section during the present memory access cycle; and d) after said step c), performing a block transfer of the data written during said step c) from said second memory section to said first memory section.

2. The method of claim 1, wherein said step d) is delayed, if said steps a) or b) are occurring at the time that said step d) would normally occur, until step b) has been completed.

3. The method of claim 1, wherein said step b) occurs immediately after said step a).

4. Arbitration circuitry for arbitrating data being written into a common memory from a general-purpose computer system and a timekeeping system in which said timekeeping system performs memory access cycles, each of said memory access cycles comprising at least one write operation which writes a value corresponding to the current time, said memory access cycles being separated by periods of non access to said common memory by said timekeeping system, said arbitration circuitry comprising:

a) first write means for writing data corresponding to a correction of said current time value
from said general-purpose system
into a first memory section of said common memory
upon receipt of a write command signal from said general-purpose system;

b) first transfer means for transferring data
from said first memory section
to a second memory section of said common memory
after data is written into said first memory section by said general-purpose system;

c) second write means for writing data corresponding to an increment of said current time value
from said timekeeping system
into said second memory section
upon receipt of a write command signal from said timekeeping system
if said general-purpose system has not written data into said first memory location during the present memory access cycle; and d) second transfer means for transferring data
to said first memory section
after data has been written into said second memory section by said timekeeping system.

5. Arbitration circuitry as set forth in claim 4 wherein the second transfer means further includes means for delaying the transfer from said second memory section to said first memory location if the first write means is writing data into said first memory section at the time that the second transfer means would normally transfer data or if said first transfer means is transferring data at the same time that said second transfer means would normally transfer data, said delay extending until after data is transferred from said first memory section to said second memory section.

6. The method of claim 1, wherein, in said step of periodically performing memory access cycles from said timekeeping system, each said write operation writes a value corresponding to the current time in seconds.

7. The method of claim 1, wherein, in said step of periodically performing memory access cycles from said timekeeping system, each said write operation writes a value corresponding to the current time in minutes and seconds.

8. The method of claim 1, wherein, in said step of periodically performing memory access cycles from said timekeeping system, each said write operation writes a value corresponding to the current time and data information.

9. The circuitry of claim 4, wherein said current time value includes a field corresponding to the current time in seconds.

10. The circuitry of claim 4, wherein said current time value includes a field corresponding to the current time in minutes and seconds.

11. The circuitry of claim 4, wherein said current time value includes a data value.

12. A computer system, comprising:
a timekeeping circuit;
a computer bus;
a memory, comprising
user and timekeeping memory sections having corresponding data structures,
said timekeeping section being read-write accessible by said timekeeping circuit, and
said user section being read-write accessible through said computer bus, independently of any access which may be made to said timekeeping section; and
arbitration logic, configured and connected to:
1) when data is written in to said timekeeping section of said memory from said timekeeping circuit,
1.a) to immediately transfer the newly written data from said timekeeping section to said user section, unless said transfer operation is delayed or inhibited as specified below; and
2) when data is written into said user section of said memory from said bus:
2.a) to immediately transfer the newly written data from said user section to said timekeeping section;
2.b) to temporarily inhibit further writes into said timekeeping section,
for the timekeeping-section byte corresponding to the user-section byte written into by the user
and for all higher order timekeeping-section bytes
but not for any lower order timekeeping-section bytes; and
2c) to delay any transfer of data from said timekeeping section to said user section
while any write operation from said bus into said user section is occurring
or any transfer from said user section to said timekeeping section is occurring.

13. The system of claim 12, wherein said timekeeping circuit performs regular update cycles to update the information in said memory.

14. The system of claim 12, wherein said timekeeping circuit performs regular update cycles to update the information in said memory, sand said update cycles each include one or more accesses to said timekeeping section of said memory, and said update cycles are separated by periods which said timekeeping circuit does not access said memory.

15. The system of claim 12, wherein said timekeeping circuit performs regular update cycles, at an average frequency of precisely 1 Hz, to update the information in said memory.

16. The system of claim 12, wherein said timekeeping circuit performs regular update cycles, in each of which said timekeeping circuit reads information from said memory, computes a new value based on the information thus read, and writes said new value back into said timekeeping section of said memory.

17. The system of claim 12, wherein said timekeeping circuit performs regular update cycles to update the information in said memory, and wherein each said inhibition operation 2.b) performed by said arbitration circuit lasts until the end of the current update cycle of said timekeeping circuit.

18. The system of claim 12, wherein each said transfer operation 1a) is a block transfer.

19. The system of claim 12, wherein each said delay operation 2.c) performed by said arbitration circuit lasts until the completion of data transfer from said user section into said timekeeping section.

20. The system of claim 12, wherein said writes into said user section of said memory through said bus are performed by a general-purpose computer.

21. The system of claim 12, wherein said user section of said memory and said timekeeping section of said memory each include a field corresponding to the current time in seconds.

22. The system of claim 12, wherein said user section of said memory and said timekeeping section of said memory each include a field corresponding to the current time in minutes.

23. The system of claim 12, wherein said user section of said memory and said timekeeping section of said memory each include a field corresponding to the current date.

24. The system of claim 12, wherein said user section of said memory and said timekeeping section of said memory each include a field corresponding to the current year date.

25. A computer system, comprising:
a timekeeping circuit;
a computer bus;
a memory, comprising
user and timekeeping memory sections having corresponding data structures,
said timekeeping section being read-write accessible by said timekeeping circuit, and
said user section being read-write accessible through said computer bus, independently of any access which may be made to said timekeeping section; and
arbitration logic, configured and connected to:
1) whenever data is written into said timekeeping section of said memory from said timekeeping circuit:
1.a) to transfer the newly written data from said timekeeping section to said user section, unless said transfer operation is delayed or inhibited as specified below;
2) and, whenever data is written into said user section of said memory from said bus:
2a) to transfer the newly written data from said user section to said timekeeping section;
2b) to temporarily inhibit further writes into said timekeeping section; and
2c) to delay any transfer of data from said timekeeping section to said user section
while any write operation from said bus into said user section is occurring
or any transfer from said user section to said timekeeping section is occurring.

26. The system of claim 25, wherein said timekeeping circuit performs regular update cycles to update the information in said memory.

27. The system of claim 25, wherein said timekeeping circuit performs regular update cycles to update the information in said memory, and said update cycles each include one or more accesses to said timekeeping section of said memory, and said update cycles are separated by periods during which said timekeeping circuit does not access said memory.

28. The system of claim 25, wherein said timekeeping circuit performs regular update cycles, at an average frequency of precisely 1 Hz, to update the information in said memory.

29. The system of claim 25, wherein said timekeeping circuit performs regular update cycles, in each of which said timekeeping circuit reads information from said memory, computes a new value based on the information thus read and writes said new value back into said timekeeping section of said memory.

30. The system of claim 25, wherein said timekeeping circuit performs regular update cycles to update the information in said memory, and wherein each said inhibition operation 2.b) performed by said arbitration circuit lasts until the end of the current update cycle of said timekeeping circuit.

31. The system of claim 25, wherein each said transfer operation 1a) is a block transfer.

32. The system of claim 25, wherein each said delay operation 2c) performed by said arbitration circuit lasts until the completion of data transfer from said user section into said timekeeping section.

33. The system of claim 25, wherein said writes into said user section of said memory through said bus are performed by a general-purpose computer.

34. The system of claim 25, wherein said user section of said memory and said timekeeping section of said memory each include a field corresponding to the current time in seconds.

35. The system of claim 25, wherein said user section of said memory and said timekeeping section of said memory each include a field corresponding to the current time in minutes.

36. The system of claim 25, wherein said user section of said memory and said timekeeping section of said memory each include a field corresponding to the current date.

37. The system of claim 25, wherein said user section of memory and said timekeeping section of said memory each include a field correponding to the current year date.

* * * * *